United States Patent
Ruiz Fernandez et al.

(10) Patent No.: US 11,326,857 B2
(45) Date of Patent: May 10, 2022

(54) EYEWEAR LENS COUPLING SYSTEM

(71) Applicant: Brixun Corporation, Carlsbad, CA (US)

(72) Inventors: German Ruiz Fernandez, Yuma, AZ (US); Jorge Alberto Tejeda Madriz, Yuma, AZ (US); Shawn Christopher McClure, Yuma, AZ (US); Akash Shailesh Sheth, Yuma, AZ (US); Larry Butler, San Juan Capistrano, CA (US); Scott Melton, Yuma, AZ (US)

(73) Assignee: Brixun Corporation, Carlsbad, CA (US)

( * ) Notice: Subject to any disclaimer, the term of this patent is extended or adjusted under 35 U.S.C. 154(b) by 59 days.

(21) Appl. No.: 16/917,537

(22) Filed: Jun. 30, 2020

(65) Prior Publication Data
US 2021/0404770 A1    Dec. 30, 2021

(51) Int. Cl.
| G02C 7/02 | (2006.01) |
| G02C 5/00 | (2006.01) |
| F41H 1/00 | (2006.01) |
| A41D 13/11 | (2006.01) |
| G02C 1/00 | (2006.01) |

(52) U.S. Cl.
CPC ........... *F41H 1/00* (2013.01); *A41D 13/1184* (2013.01); *G02C 1/10* (2013.01); *G02C 5/003* (2013.01); *G02C 2200/20* (2013.01)

(58) Field of Classification Search
CPC ........... G02C 5/008; G02C 5/003; G02C 1/10
USPC ............................................. 351/83, 85, 86
See application file for complete search history.

(56) References Cited

U.S. PATENT DOCUMENTS

| 3,884,561 | A | | 5/1975 | Kodys | |
| 4,196,982 | A | * | 4/1980 | Watkins | G02C 1/06 2/443 |
| 6,254,234 | B1 | * | 7/2001 | Utsumi | G02C 1/06 351/83 |
| 6,588,897 | B1 | * | 7/2003 | Nadler | G02C 1/06 351/154 |
| 6,959,988 | B1 | | 11/2005 | Sheldon | |
| 7,281,793 | B2 | | 10/2007 | D'Agostino | |
| 7,819,522 | B2 | | 10/2010 | Sheldon | |
| 9,581,829 | B1 | | 2/2017 | Li | |
| 10,012,846 | B1 | * | 7/2018 | Santinelli | G02C 1/10 |
| 2010/0002187 | A1 | * | 1/2010 | Nauche | B24B 9/148 351/83 |
| 2015/0109572 | A1 | * | 4/2015 | Wiand | G02C 7/02 351/83 |
| 2019/0178611 | A1 | * | 6/2019 | McKenna | B32B 17/10 |

FOREIGN PATENT DOCUMENTS

| FR | 2 768 953 | 4/1999 |
| FR | 3 072 472 | 4/2019 |
| FR | 3 084 612 | 2/2020 |

(Continued)

*Primary Examiner* — Darryl J Collins
(74) *Attorney, Agent, or Firm* — Knobbe Martens Olson & Bear, LLP

(57) ABSTRACT

An eyewear lens coupling system and methods can be used during assembly of an eyewear. The system and methods may advantageously decrease optical distortion of the lens during assembly and use and/or may also advantageously increase retention of the lens to the eyewear frame to improve the overall quality of the eyewear.

39 Claims, 7 Drawing Sheets

(56) References Cited

FOREIGN PATENT DOCUMENTS

| KR | 10-2008-0029067 A | 4/2008 |
|----|-------------------|--------|
| KR | 20-2010-0002113 U | 3/2010 |
| WO | WO 1987 05123 | 8/1987 |

* cited by examiner

EYEWEAR LENS COUPLING SYSTEM

BACKGROUND OF THE INVENTION

Field of the Invention

This application relates generally to eyewear and specifically to antiballistic eyewear.

Description of the Related Art

In antiballistic eyewear, eyewear lenses sometimes are difficult to insert into eyewear frames, requiring a high degree of skill and the application of a large amount of force by an assembler.

In addition, the lenses in antiballistic eyewear sometimes undergo optical distortion and/or are damaged during insertion of the lenses into or during retention of the lens by the frame of the eyewear. The eyewear lenses can be distorted and damaged for a number of reasons, including the force applied to the lenses when coupling the lenses to the frame, the frame compressing or twisting the lenses when the eyewear is assembled and during use, and other reasons. As a result, the lenses of the eyewear may not function optimally.

SUMMARY OF THE INVENTION

Eyewear systems and components are desired for providing high-level antiballistic capabilities while decreasing optical distortion, difficulties in assembly, and damage to lenses or frames during assembly or use. Some embodiments disclosed in this specification achieve one or more of these advantages.

In some embodiments, an antiballistic eyewear may comprise one or more of the following features. A metal frame can comprise a lens-receiving region. The lens-receiving region can comprise a front wall comprising a front surface and a rear connection surface. The front surface can be generally parallel to the rear connection surface. The lens-receiving region can comprise a rear wall which can comprise a front connection surface and a rear surface. The lens-receiving region can comprise a middle wall extending between the front wall and the rear wall. The front connection surface can be formed at a non-orthogonal angle relative to the middle wall. A lens can comprise a peripheral edge. The peripheral edge can correspond in shape to the rear connection surface of the front wall, to the middle wall, and to the front connection surface of the rear wall. The eyewear can be capable of withstanding or being hit by a projectile of at least about .15 caliber traveling at a speed of at least about 700 feet per second without shattering, penetrating through the lens, and/or dislodging or removing the lens from the eyewear frame.

In some embodiments, an antiballistic eyewear may comprise any one or more of the following: a rear wall can extend farther into an interior of the lens-receiving region than a front wall; a rear connection surface can be formed at a generally orthogonal angle relative to a middle wall; a middle wall can comprise a width that is larger than a width of a front wall; a peripheral edge of a lens can be configured to form a friction fit with a lens-receiving region of a frame; a peripheral edge of a lens can comprise one or more of the following features: a front wall comprising a front connection surface being configured to interact with a rear connection surface of a front wall of a frame, a middle wall being configured to interact with a middle wall of a frame, and a rear wall comprising a rear connection surface being configured to interact with a front connection surface of a rear wall of a frame; a rear connection surface of a lens can comprise a length larger than a length of a front connection surface of a rear wall of a frame; a middle wall of a lens can comprise a width larger than a width of a middle wall of a frame; an eyewear can be configured to satisfy at least some portions of the MIL-PRF-32432A standard.

In some embodiments, an eyewear may comprise one or more of the following features. One or more lens can each comprise a first front connection surface. One or more lens can each comprise a first rear connection surface being formed at a first angle relative to a first front connection surface. A frame can comprise a frame connection structure being configured to receive at least a portion of a lens to couple the one or more lens to the frame. A frame connection structure can comprise a second front connection surface being configured to interact with a first front connection surface of one or more lens. A second front connection surface comprising a first height. A frame connection structure can comprise a second rear connection surface comprising a second height. The second height can be greater than a first height of a second front connection surface such that the second rear connection surface is offset relative to the second front connection surface. A second rear connection surface can be formed at a second angle relative to a second front connection surface and can be generally similar to a first angle of a first rear connection surface. A second rear connection surface can be configured to interact with a first rear connection surface of the one or more lens.

In some embodiments, an antiballistic eyewear may comprise any one or more of the following: a lens can comprise a first middle connection surface and a frame connection structure can comprise a second middle connection surface; the first middle connection can comprise a first width that is larger than a second width of the second middle connection surface; a first front connection surface can extend from a first middle connection surface; a first rear connection surface can extend from a first middle connection surface; a second front connection surface can extend from a second middle connection surface; a second rear connection surface can extend from the second middle connection surface; a first rear connection surface can comprise a first length that is larger than a second length of a second rear connection surface; a frame that is metal; a frame connection structure that is configured to form a friction fit with a portion of a lens; an eyewear can be configured to satisfy at least some portions of the MIL-PRF-32432A standard.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters denote corresponding features consistently throughout similar embodiments. The following is a brief description of each of the drawings.

DETAILED DESCRIPTION

Figure 1A:
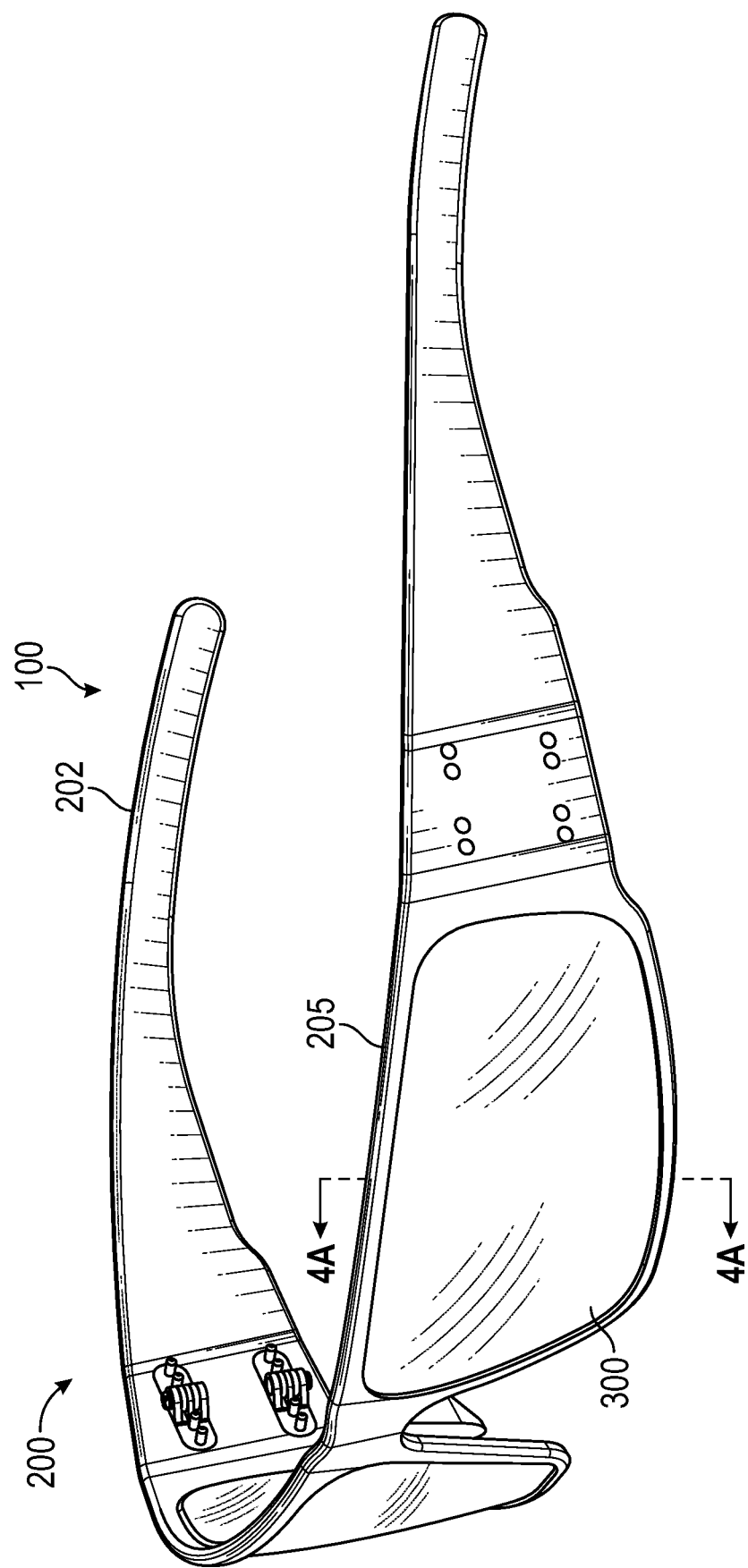
FIG. 1A is a perspective view of an embodiment of an eyewear.

Various devices, methods, and components can be used in different embodiments of an eyewear. Some embodiments are illustrated in the accompanying figures; however, the figures are provided for convenience of illustration only, and should not be interpreted to limit the inventions to the particular combinations of features shown.
Overview This application is directed to an eyewear lens coupling system and methods that can be used during assembly of an eyewear. As discussed in greater detail below, the devices and methods herein may, in some embodiments, advantageously decrease optical distortion of the lens during assembly and use and/or may also advantageously increase retention of the lens to the eyewear frame to improve the overall quality of the eyewear.

Any of the eyewear devices described herein may satisfy ballistic safety standard such that the eyewear may protect a user from small projectiles and fragments. In some instances, an individual may wear the eyewear while using firearms and/or while being involved in various activities where the individual's eyes or face may be exposed to small projectile fragment(s). Eyewear that satisfy the ballistic safety standards provide improved protection to a user's eyes or face in the event that a projectile strikes the eyewear. For example, military personnel may be required to use protective eyewear during combat situations. By way of other examples, individuals who work in manufacturing or construction environments or individuals who engage in recreational firearm use may also require eyewear devices that satisfy ballistic safety standards.

The ballistic safety standards require that eyewear satisfies requirements relating to various aspects of the eyewear: such as optical quality of the eyewear lens; capability of the eyewear to retain an eyewear lens within an eyewear frame when the eyewear is struck with a projectile; resistance to damage, destruction, or dislodgement of the eyewear lens when struck with a projectile; or other aspects of the eyewear. Military standard MIL-PRF-32432A identifies a performance specification for Military Combat Eye Protection (MCEP) system that provides protection from dust, flying debris, and ballistic hazards both in training and on the battlefield while maintaining compatibility with existing military equipment. American National Standards Institute (ANSI) also identifies standard Z87.1-2015 that sets forth criteria related to the description, general requirements, testing, marking, selection, care, and use of protectors to minimize or prevent injuries, from such hazards as impact, non-ionizing radiation, and chemical type injuries, in occupational and educational environments including, but not limited to, machinery operations, material welding and cutting, chemical handling, and assembly operations. As described in further detail herein, any of the devices or connections or features that are described and/or illustrated anywhere in this specification can be configured to improve assembly and attachment of an eyewear lens to an eyewear frame such that the eyewear is in compliance with at least some portions of the MIL-PRF-32432A standard, ANSI Z87.1 standard, and/or any other industry standard that is applicable to eyewear. For example, the eyewear may be in compliance with aspects of one or more of the industry standards that relate to ballistic testing.

For example, in some embodiments, an antiballistic eyewear can be configured to withstand impact from a ballistic projectile. In some embodiments, the eyewear can withstand at least one impact to one or both lenses of the eyewear by a projectile of at least about .10 caliber or at least about .15 caliber traveling at a speed of at least about 600 feet per second or at least about 750 feet per second. The eyewear, in some instances, can withstand a projectile traveling at a speed of 700 feet per second to 725 feet per second. In some embodiments, the eyewear can be hit by a projectile of at least about .10 caliber or at least about .15 caliber traveling at a speed of at least about 600 feet per second or at least about 750 feet per second without shattering, penetrating through the lens, and/or dislodging or removing the lens from the eyewear frame. The impact, in some instances, may be at normal incidence (e.g., about 0 degree obliquity) to the impacted lens at a location generally within a center of the lens. For example, the impact to the lens may be at least about 0.76 cm or at least about 1 cm away from an edge of the lens and does not impact the frame of the eyewear. In some embodiments, the projectile may be a .15 caliber, 5.85 (±0.015) grain, T37 shaped projectile. By way of example, the eyewear may be considered to not withstand an impact (s) if one or more of the following occur: a witness sheet of the lens is perforated or if the lens is penetrated by the projectile; if the primary lens is cracked, fractured, or shattered; if one or more fragments become dislodged on the inside of the eyewear; if an eyewear component needed to retain the eyewear on a subject head form becomes completely separated from the eyewear; if a lens becomes completely separated from the frame or if the eyewear falls off the head form; if the lens delaminates and results in a loose flap of material larger than the diameter of the projectile on the rear surface of the eyewear; and if the primary lens separates from the frame to such a degree as to allow passage of a fragment projectile.

In some embodiments, an antiballistic eyewear can be configured to withstand impact from a steel projectile. The eyewear may be able to withstand at least one impact to one or both lenses of the eyewear by one or more of the following projectiles: a steel ball having a 5.5 mm to 6.5 mm steel ball traveling at 130 to 375 feet per second; a pointed projectile weighing at a minimum of 16.5 oz that is dropped from a height of at least 45 in.; or a weighted needle with a minimum total weight of 1.4 oz dropped from a height of at least 45 in. By way of example, the eyewear may be considered to not withstand an impact(s) if one or more of the following occur: any part, fragment or material visible to the unaided eye becomes detached from the inner surface of any complete device, as determined by inspection of the device or of the contact paste; fracture; penetration of the inner surface either by the projectile passing completely through the lens, frame or housing component, or by rupture of the inner lens surface; lens not retained; or the unaided eye observes any piece adhering to the contact paste, or observes contact paste on the projectile or complete device.

Eyewear

Figure 1B:
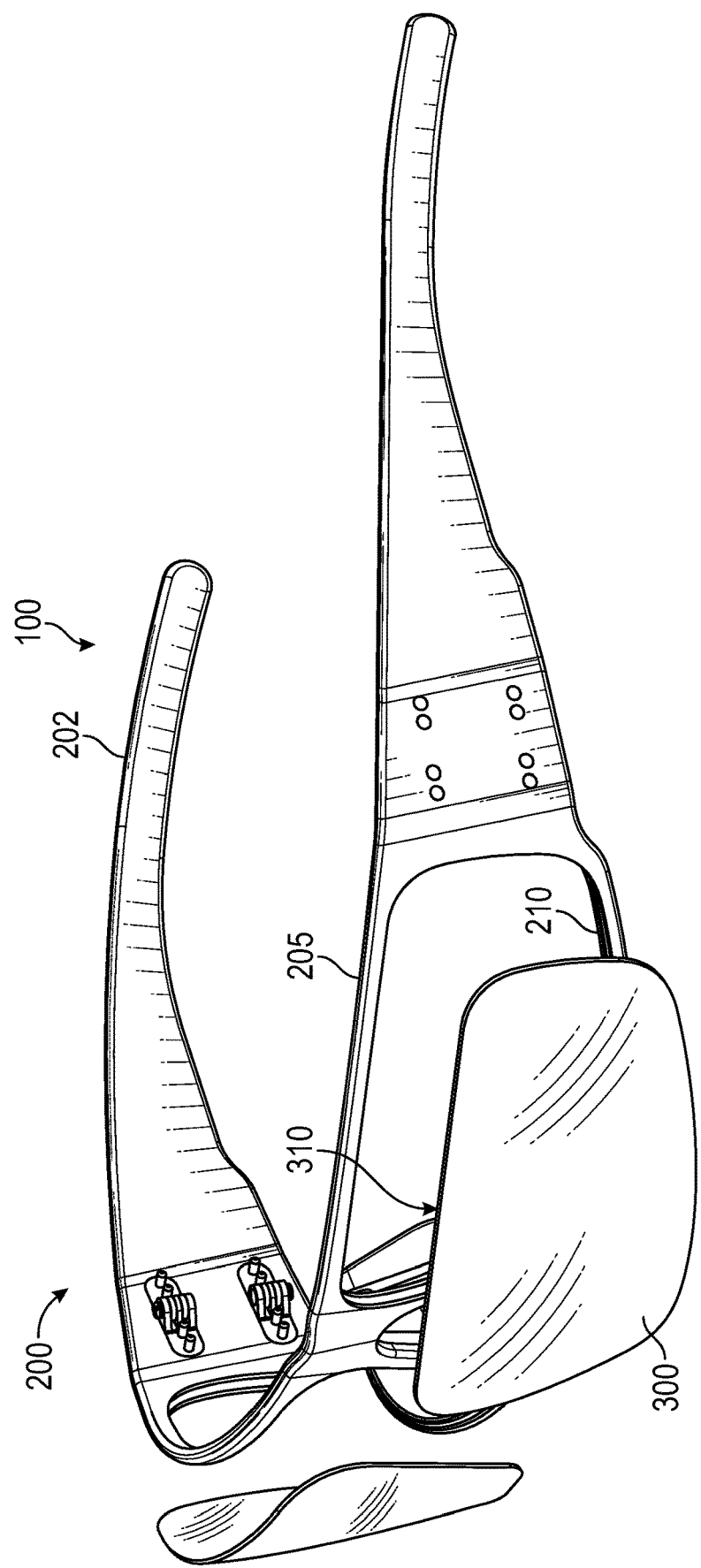
FIG. 1B is a perspective exploded view of the eyewear of FIG. 1A.

FIG. 1A is a perspective view of an eyewear 100, and FIG. 1B is a perspective exploded view of the eyewear 100. The eyewear 100 includes a frame 200 and one or more lenses 300. The frame 200 is shown as having earstems 202 that may be configured to assist in maintaining the eyewear 100 on a user during use, such as by gripping or residing along a user's head or ears. In the illustrated example, the earstems are wide, approximately the same width as the front face of the eyewear in the region where the front face of the eyewear and the earstems attach. In some embodiments, the earstems can be at least about half as wide as the region of the front face of the eyewear where the front face of the eyewear and the earstems attach. As shown, in some embodiments, the front face and earstems of the eyewear can include a wrapped shape to closely conform to a user's face and head, and/or a degree of pantoscopic tilt or "rake" whereby the lower edge of the frame orbitals and/or lenses can tilt inwardly more toward the face than the upper edge of the frame orbitals and/or lenses to closely conform to a user's face. The shape of the eyewear can resist the formation of large or significant gaps between the eyewear and the user's face during use which may otherwise increase the likelihood that light and/or projectiles or debris may contact the user's eyes or face through a space between the eyewear and the user's head.

The example of eyewear shown in the figures is dual-lens eyewear, but anything shown or described in this specification can be used in any other eyewear, such as an eyewear shield system or a single-lens or monolens eyewear. The example of eyewear shown in the figures comprises lens-receiving regions with orbitals that are closed, integral, and unitary with the rest of the front face of the eyewear. The example orbitals are closed in that each orbital fully surrounds the inserted lens. A closed orbital can be formed of one or more separate pieces connected together (not shown). The example orbitals are integral in that they are formed of a single piece of material, without requiring connectors to attach components of the orbital to each other during insertion or removal of a lens. The example orbitals are unitary with the rest of the front face of the eyewear in that they are formed of a single piece of material with the rest of the front face of the eyewear, without requiring connectors to attach the orbitals to the rest of the front face of the eyewear. Many other structures and configurations can be used instead of or in addition to those illustrated in the examples. The orbitals illustrated and described are examples. Any suitable lens-receiving region can be used, whether or not it is an orbital with these features, or whether or not it is an orbital at all.

The lenses used in the eyewear can be of any suitable type: plano, prescription, spherical, cylindrical, toroidal, light-attenuating, UV-protecting, polarized, molded to shape, cut from lens blanks, interference-layer coated, anti-scratch, antiglare, antireflective, antifog, and/or any other type of lenses. In some embodiments, the lenses are formed of a suitable anti-shatter, antiballistic material such as plastic (e.g., polycarbonate), glass, or any other material suitable for a particular application or use. In some embodiments, the lenses may be formed of a material that is slightly or somewhat less rigid or more conforming than the eyewear frame such that one or more edges of the lenses may compress slightly when inserted into the eyewear frame.

As illustrated in FIG. 1B, the frame 200 of the eyewear 100 can include one or two lens-receiving regions or orbitals that include a lens coupling portion 205 that is configured to engage with the lens 300 to securely engage with and retain the lens 300 to the frame 200 during use. As explained in further detail herein, the frame coupling portion 205 may include a frame connection 210 that is configured to interact with a lens connection 310 of the lens 300 to form a coupling between the frame 200 and the lens 300 once the eyewear 100 is assembled. The coupling between the frame connection 210 and the lens 310 may advantageously facilitate assembly of the lens 300 to the frame 200, decrease optical distortion of the lens 300 during use, and/or increase retention of the lens 300 to the frame 200 to improve the overall quality of the eyewear 100, including in some embodiments increased retention during ballistic events.

Although FIGS. 1A and 1B illustrate an example eyewear 100 that incorporates earstems 202 and two lens 300, any feature, structure, material, step, or component described herein may be readily incorporated into any other suitable form of eyewear: such as googles, masks, helmets, etc. For example, any of the following features and methods may be incorporated into an eyewear that includes a unitary or singular lens design, an alternative to the eyewear stem (such as a strap or helmet design), or any other modified version of an eyewear that may be readily adapted to include any feature, structure, material, step, or component described herein.

The frame 200 may be formed of any suitable type of material. In some embodiments, the frame 200 may be formed of one or more metals (e.g., stainless steel, cobalt chromium, titanium, monel, beryllium, aluminum, or an alloy combination including any of these metals). Frames that include metal material may provide various advantages: such as increased durability, strength, resistance to scratching, snapping, chipping, and/or breaking, resistance to corrosion, resilience, etc. In certain instances, frames made of metal material may provide particular advantages in situations involving ballistics, such as military combat situations, manufacturing environments, or for recreational firearm usage. The metal material may provide increased durability of the eyewear, while also further increasing lens retention capabilities when the eyewear is exposed to small projectile fragment(s). For example, an increased rigidity and durability due to a metal material may further inhibit disconnection of the coupling between the frame connection and the lens connection once the eyewear is assembled relative to a frame made of non-metal material. In some embodiments, the frame 200 may be formed of a polymer or plastic (e.g., carbon fiber, xylonite, cellulose acetate, cellulose acetate propionate, or blended nylon). Frames that include polymer or plastic material may provide various advantages: such as increased malleability or deformability during assembly of the lens to the frame, decreased cost, decreased weight of the frame, increased variety in colors and style, etc.

Coupling

Figure 2A:
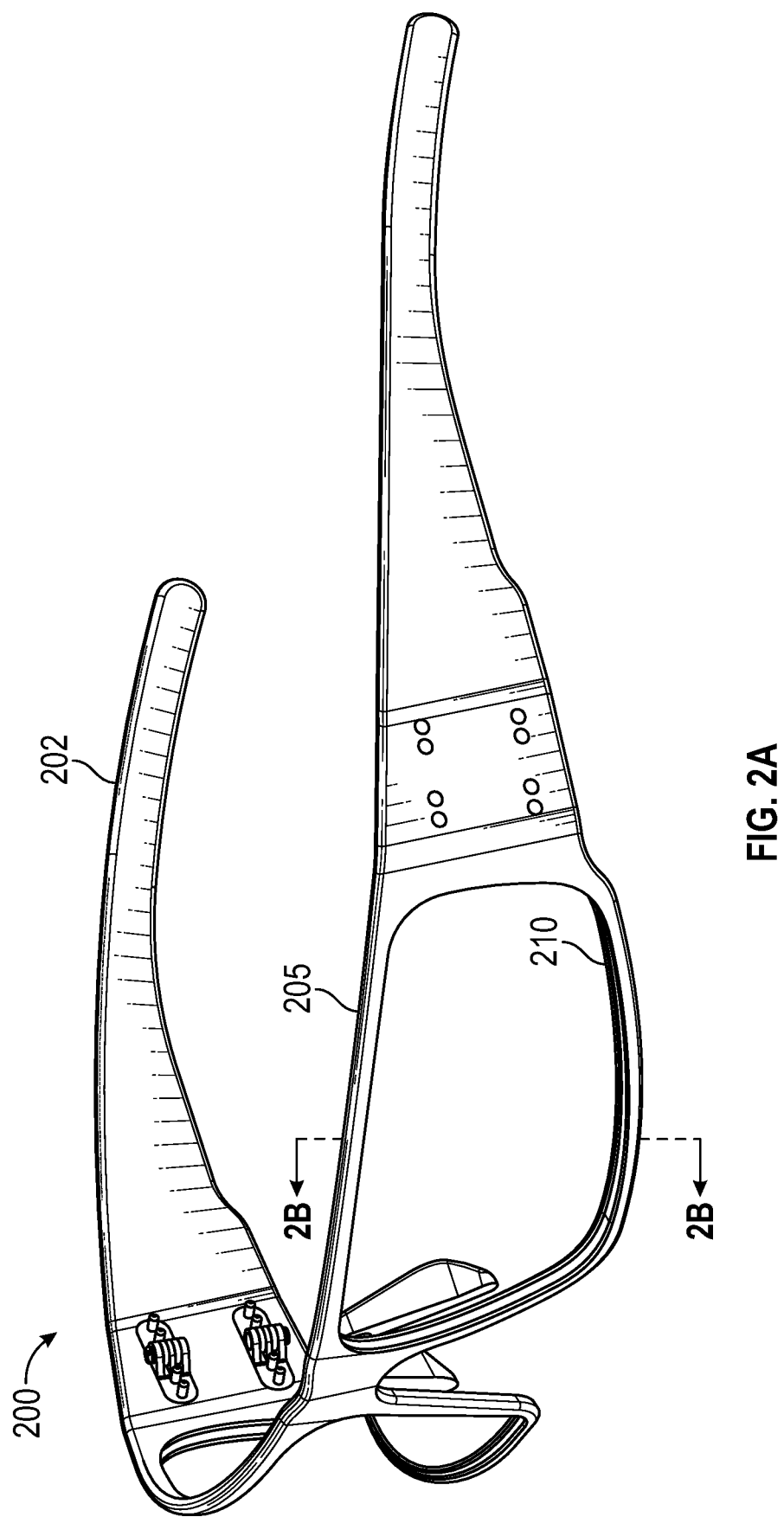
FIG. 2A is a perspective view of an embodiment of a frame of an eyewear.
Figure 2B:
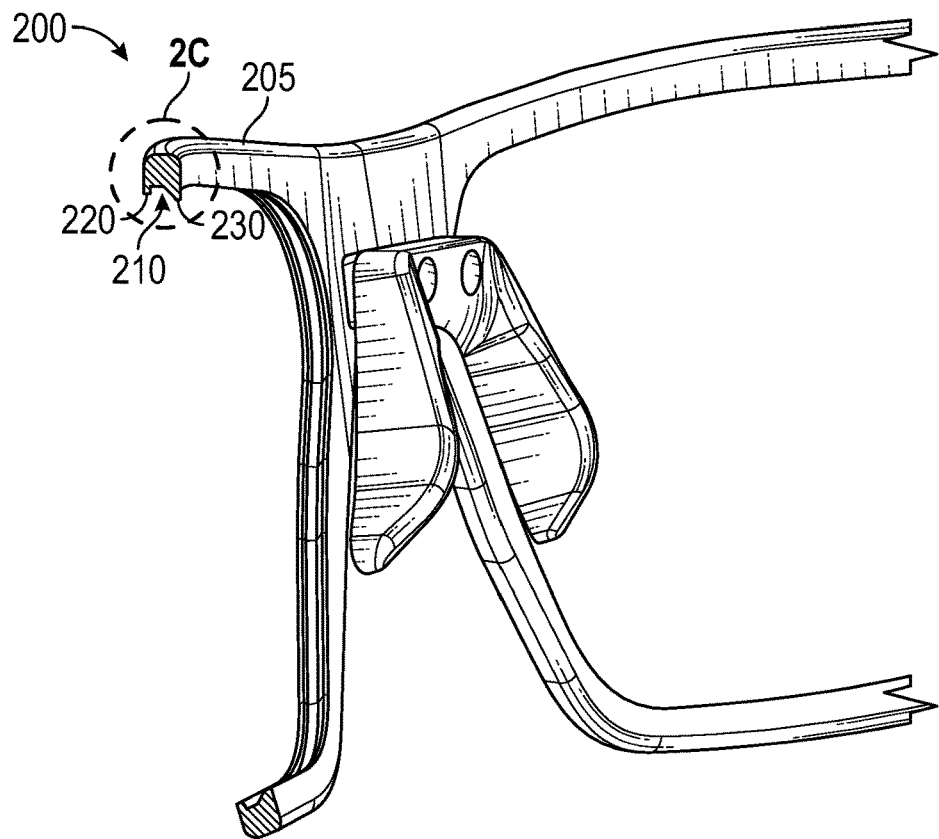
FIG. 2B is a cross-sectional side view of the frame of FIG. 2A taken along line 2B-2B in FIG. 2A.
Figure 2C:
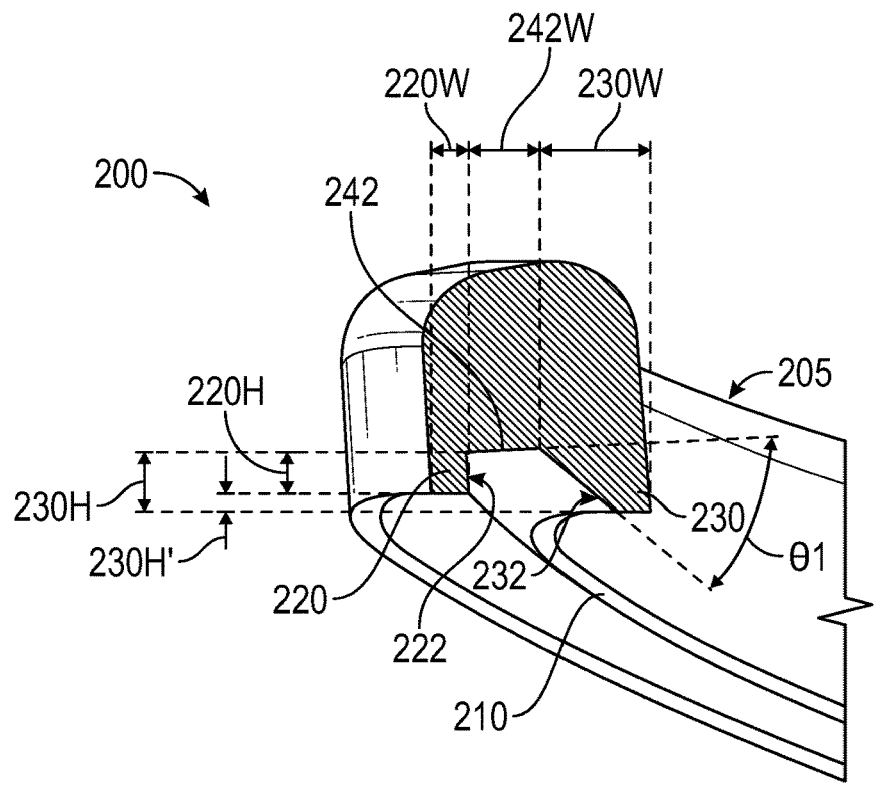
FIG. 2C is an enlarged side view of a portion of the frame of FIG. 2B as identified in circle 2C in FIG. 2B.

FIGS. 2A-2C show various views of the frame 200 of the eyewear 100. FIG. 2A is a perspective view of the frame 200 of an eyewear 100; FIG. 2B is a cross-sectional view of the frame 200 along line 2B-2B illustrated in FIG. 2A; and FIG.

2C is an enlarged view of a portion of the frame connection 210 as identified in circle 2C illustrated in FIG. 2B.

The frame 200 has a lens coupling portion 205 that may be configured to couple with at least a portion of the lens 300 when the eyewear 100 is assembled. The lens coupling portion 205, in some instances, can include a lens opening that is configured to receive the lens 300. The lens coupling portion 205, in some embodiments, can extend along an outer periphery of the lens 300 once assembled.

In some instances, as illustrated in FIGS. 2B and 2C, an interior surface of the lens coupling portion 205 that faces the lens opening can include the frame connection 210 that is configured to interact with an outer periphery of the lens 300 (e.g., a lens connection 310) to form a coupling between the frame 200 and the lens 300 once the eyewear 100 is assembled. As discussed further herein, a secure coupling is provided in at least one configuration of the eyewear 100 between the frame 200 and the lens 300. The frame connection 210 can be configured to facilitate engagement of the lens 300 to the frame 200 while also to inhibit disengagement of the lens 300 from the frame 200 where appropriate. For example, the frame connection 210 can include a groove, a scallop, a notch, a cavity, or other receding structure configured to receive or be received by at least a portion of the lens 300, such as the lens connection 310. The frame connection 210 can extend along an interior periphery of the lens coupling portion 205 of the frame 200. The frame connection 210 can have any shape suitable for receiving and interacting with at least a portion of the lens 300, such as a semi-circular shape.

The frame connection 210 can include one or more walls and/or surfaces along at least a portion of the receding structure. In some embodiments, the frame connection 210 can have a front wall 220 with a front connection surface 222 and a rear wall 230 with a rear connection surface 232, as illustrated in FIGS. 2B and 2C. In some instances, the front connection surface 222 and the rear connection surface 232 may include an interior perimeter of the receding structure of the frame connection 210. In an alternative embodiment, as illustrated in FIGS. 2B and 2C, the frame connection 210 may further comprise a middle connection surface 242 extending between the front connection surface 222 and the rear connection surface 232.

The middle connection surface 242 can be substantially straight or tapered. The middle connection surface 242 can extend along a width 242W between the front connection surface 222 and the rear connection surface 232. The width 242W may be configured to receive at least a portion of the lens 300 when the eyewear 100 is assembled. For example, the width 242W may generally correspond to a width 340W of a middle connection surface 340 of the lens 300, as illustrated and described in FIG. 3C. In some instances, the width 242W of the middle connection surface 242 may be larger than the width 220W of the front wall 220 of the frame connection 210. For example, the width 242W of the middle connection surface 242 may be about twice as large as the width 220W of the front wall 220 of the frame connection 210. In some instances, the width 242W of the middle connection surface 242 may be larger than the width 230W of the rear wall 230 of the frame connection 210. For example, the width 242W of the middle connection surface 242 may be about one and a half times as large as the width 230W of the rear wall 230 of the frame connection 210.

In some instances, one or more of the front connection surface 222, the middle connection surface 242, and the rear connection surface 232 may be sized and shaped to engage a corresponding surface along the lens connection 310, as described herein. For example, in some embodiments, the rear connection surface 232 extend along a first angle $\theta 1$ relative to the middle connection surface 242 as illustrated in FIG. 2C. Angle $\theta 1$ may correspond to an angle $\theta 2$ provided on a rear connection surface 330 of the lens 300, as illustrated and described herein in connection with FIG. 3C. In this manner, the rear connection surface 232 of the frame 200 is configured to engage with the rear connection surface 330 of the lens 300 when the lens 300 is assembled with the frame 200, e.g., when the frame connection 210 securely couples with the lens connection 310. In some embodiments, the angle $\theta 1$ and the angle $\theta 2$ may be selected to facilitate insertion and assembly of the lens 300 into the frame 200 while also inhibiting detachment of the lens 300 from the frame 200 if a rear directed force is applied to the lens 300 once assembled. For example, the angle $\theta 1$ and the angle $\theta 2$ may each comprise a 45 degree angle. However, any angle suitable to facilitate assembly and inhibit disengagement may be selected. By way of further example, angles $\theta 1$ and $\theta 2$ may comprise any angle between 30 degrees to 60 degrees.

As illustrated in FIGS. 2A-2C, in some embodiments, the front connection surface 222 may extend along a generally orthogonal direction relative to the middle connection surface 242 of the frame connection 210. In this manner, the front connection surface 222 may further inhibit detachment of the lens 300 from the frame 200 if a front-facing force is applied to the lens 300 once assembled to the frame 200. A generally 90 degree angle of the front connection surface 222 relative to the middle connection surface 242 will advantageous provide increased retention of the lens 300 to the frame 200 when compared to a front connection surface that may be formed at a non-orthogonal angle. However, the front connection surface 222 may also be formed at any angle relative to the middle connection surface 242 that corresponds to an angle of a front connection surface 320 of the lens 300. For example, the front connection surface 222 may be formed at an angle relative to the middle connection surface 242 of any angle between 90 degrees to 45 degrees.

The front wall 220 and the rear wall 230 of the frame connection 210 can be configured to engage the lens connection 310 of the lens 300 to retain the lens 300 within the frame connection 210 once the eyewear 100 is assembled. In some instances, the front wall 220 and/or the rear wall 230 can include a peg, a barb, a screw, or other protruding structure configured to further engage the lens connection 310 by a snap fit, interference fit, or otherwise.

Each of the front wall 220 and the rear wall 230 can be configured to inhibit disengagement of the lens 300 from the frame 200. For example, as discussed herein, the front wall 220 can be sized and shaped to inhibit the lens 300 from disengaging the frame 200 when a front-facing force is applied to the lens 300 such that the front wall 220 may counteract the front-facing force and inhibit the lens 300 from disassembling from the frame connection 210. The front wall 220 may also be sized and shaped to permit insertion of the lens connection 310 into the frame connection 210 and coupling between the features 310, 210. As described in further detail in connection with FIG. 6, a height 220H of the front wall 220 may be selected to permit insertion and coupling of the lens 300 during assembly while inhibiting disengagement of the lens 300 during use.

In some embodiments, as discussed herein, the rear wall 230 can be sized and shaped to inhibit the lens 300 from disengaging the frame 200 when a rear-facing force is applied to the lens 300 such that the rear wall 230 may counteract the rear-facing force and inhibit the lens 300 from disassembling from the frame connection 210. For example, a height 230H of the rear wall 230 may be selected to inhibit disengagement of the lens 300 during use.

As illustrated in FIG. 2C, in certain instances, a difference in heights between the height 220H of the front wall 220 and the height 230H of the rear wall 230 may result in an offset 230H' in height between the two walls. The offset 230H' may be selected as a result of the height 220H of the front wall 220 being configured to permit insertion of the lens 300 along the front wall 220 and to resist disengagement of the lens 300 along the front wall 220, while the height 230H of the rear wall 230 is configured to resist disengagement of the lens 300 along the rear wall 230. For example, the height 230H of the rear wall 230 may be about one and a half times as large as the height 220H of the front wall 220 of the frame connection 210.

In some embodiments, as shown, the frame connection 210 can comprise a front wall 220 and a rear wall 230 spaced from either other by approximately the width of an edge of a peripheral region on a lens 300. The front wall 220 can comprise generally vertical front and rear surfaces extending from the rest of the eyewear frame 200 toward the interior lens-receiving region enclosed by the orbital (e.g., lens coupling portion 205) with an interior-facing, generally horizontal, wall surface extending between the front and rear surfaces of the front wall 220. The rear surface of the front wall 220 is also referred to herein as the front connection surface 222. The interior-facing wall surface can be generally perpendicular to the front and rear surfaces of the front wall 220. The rear wall 230 can be positioned posterior to, behind, and/or spaced away from, the front wall 220. The rear wall 230 can comprise front and rear surfaces extending from the rest of the eyewear frame toward the interior region enclosed by the orbital with an interior-facing, generally horizontal, wall surface extending between the front and rear surfaces of the rear wall 230. The front surface of the rear wall 230 is also referred to herein as the rear connection surface 232. The rear wall 230 can comprise a beveled or chamfered side and a straight side. The front and rear surfaces of the rear wall 230 can be non-parallel or oblique to each other, such that the front surface of the rear wall 230 can be angled or tapered as shown. The front surface of the rear wall 230 can be sloped or tapered, and non-parallel, non-perpendicular, or oblique to the middle connection surface 242 as shown. The interior-facing wall surface of the front wall 220 and the interior-facing wall surface of the rear wall 230 can be substantially parallel with each other. The middle connection surface 242 can comprise an interior-facing wall that is substantially parallel with either or both of the interior-facing wall surfaces of the front wall 220 and/or the rear wall 230. The middle connection surface 242 can extend between and be adjacent to each of the front wall 220 and the rear wall 230, as illustrated.

The height or distance by which the front and/or rear surfaces of the front wall 220 extend into the interior lens-receiving region enclosed by the orbital can be less than the height or distance by which the front and/or rear surfaces of the rear wall 230 extend into the interior lens-receiving region enclosed by the orbital, such that the rear wall 230 can be larger than, or extend further into the lens-receiving region than, the front wall 220. The interior-most edge of the sloped surface of the front surface of the rear wall 230 can extend further into the interior lens-receiving region than the interior-facing surface of the front wall 220.

Figure 3A:
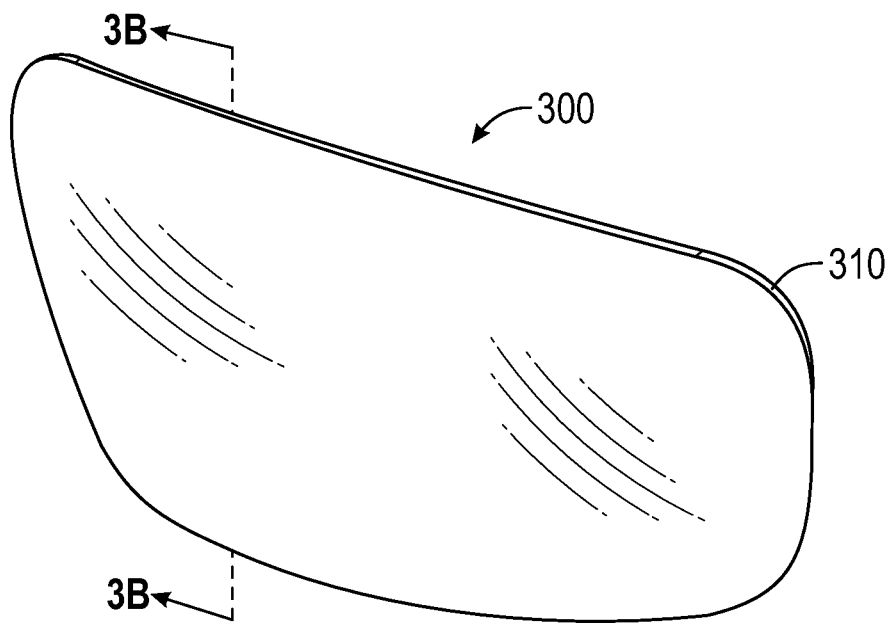
FIG. 3A is a front perspective view of an embodiment of a lens of an eyewear.
Figure 3B:
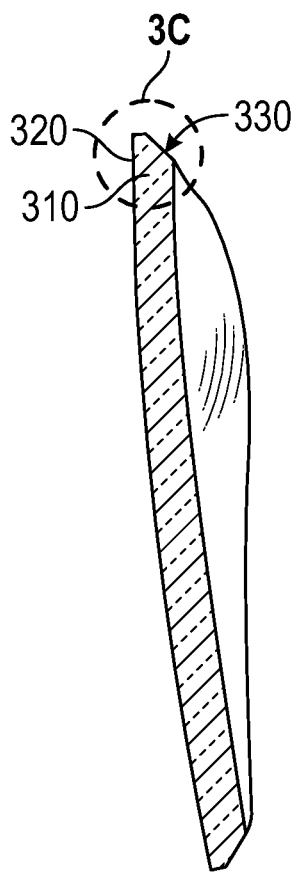
FIG. 3B is a cross-sectional side view of the lens of FIG. 3A taken along line 3B-3B in FIG. 3A.
Figure 3C:
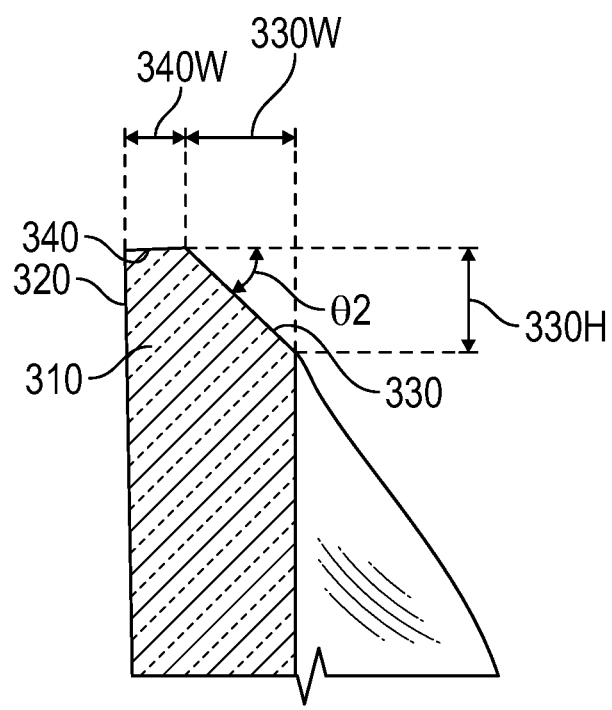
FIG. 3C is an enlarged side view of a portion of the lens of FIG. 3B as identified in circle 3C in FIG. 3B.

FIGS. 3A-3C show various views of the lens 300 of the eyewear 100. FIG. 3A is a perspective view of the lens 300 of an eyewear 100; FIG. 3B is a cross-sectional view of the lens 300 along line 3B-3B illustrated in FIG. 3A; and FIG. 3C is an enlarged view of a portion of the lens connection 310 as identified in circle 3C illustrated in FIG. 3B.

The lens 300 has an exterior surface that can include a lens connection 310 that is configured to interact with the frame connection 210 when the eyewear 100 is assembled. As discussed further herein, a secure coupling is provided in at least one configuration of the eyewear between the frame 200 and the lens 300. The lens connection 310 can be configured to facilitate engagement of the lens 300 to the frame 200 while also to inhibit disengagement of the lens 300 from the frame 200 where appropriate. For example, the lens connection 310 can include a ridge, projection, flange, lip, or other protruding structure configured to be received by at least a portion of the frame 200, such as the frame connection 210. The lens connection 310 can extend along an outer periphery of the lens 300. The lens connection 310 can have any shape suitable for being received by and interacting with at least a portion of the frame 200, such as a semi-circular shape.

Although the frame connection 210 is illustrated in the Figures as comprising a receding structure to receive a portion of the lens connection 310, the structures of the frame connection 210 and the lens connections 310 may be readily modified and reversed to perform the same function. For example, the lens connection 310 may comprise a receding structure (e.g., as described and illustrated herein in connection with the frame connection 210) that is configured to receive at least a portion of the frame connection 210 that comprises a protruding structure (e.g., as described and illustrated herein in connection with the lens connection 310) to establish a secure coupling between the lens 300 and the frame 200 when the eyewear 100 is assembled.

The lens connection 310 can include one or more surfaces along at least a portion of the outer periphery of the lens. In some embodiments, the lens connection 310 can have a front connection surface 320 and a rear connection surface 330. In some instances, the front connection surface 320 and the rear connection surface 330 may include an exterior perimeter of the protruding structure of the lens connection 310. In an alternative embodiment, as illustrated in FIGS. 4B and 4C, the lens connection 310 may further comprise a middle connection surface 340 extending between the front connection surface 320 and the rear connection surface 330. The lens 300 can include a bevel or chamfer on a posterior peripheral edge configured to contact the rear connection surface 232 or front surface of the rear wall 230.

The middle connection surface 340 can be substantially straight or tapered. The middle connection surface 340 extend along a width 340W between the front connection surface 320 and the rear connection surface 330. The width 340W may be configured to be received by at least a portion of the frame 300 when the eyewear 100 is assembled. For example, the width 340W may generally correspond to the width 242W of the middle connection surface 242 of the frame 200, as illustrated and described in FIG. 2C. In some instances, the width 340W of the middle connection surface 340 may be larger than the width 242W of the middle connection surface 242 of the frame 200. For example, the width 340W of the middle connection surface 340 may be slightly larger than the width 242W so as to create a friction or interference fit between the lens connection 310 and the frame connection 210 to advantageously increase the retention of the lens 300 with the frame 200. The width 340W may be selected so as to form an interference fit without causing excess strain on the lens 300 once the eyewear 100 is assembled. In some instances, excess strain on the lens 300 may distort optical properties of the lens 300 by causing deformation of the lens 300 as the eyewear 100 is being assembled and once the lens 300 is coupled to the frame 300. In some instances, the width 340W of the middle connection surface 340 may be smaller than the width 330W of the rear wall 330 of the lens connection 310. For example, the width 340W of the middle connection surface 340 may be about half the width 330W of the rear wall 330 of the lens connection 310.

In some instances, one or more of the front connection surface 320, the middle connection surface 340, and the rear connection surface 330 may be sized and shaped to engage a corresponding surface along the frame connection 210, as described herein. For example, in some embodiments, the rear connection surface 330 may extend along an angle θ2 relative to the middle connection surface 340, as illustrated in FIG. 3C. Angle θ2 may correspond to angle θ1 provided on the rear connection surface 232 of the frame 200, as illustrated and described herein in connection with FIG. 2C. In this manner, the rear connection surface 330 of the lens 300 is configured to engage with the rear connection surface 232 of the frame 200 when the lens 300 is assembled with the frame 200, e.g., when the frame connection 210 securely couples with the lens connection 310. As described herein, in some embodiments, the angle θ1 and the angle θ2 may be selected to facilitate insertion and assembly of the lens 300 into the frame 200 while also inhibiting detachment of the lens 300 from the frame 200 if a rear directed force is applied to the lens 300 once assembled. For example, the angle θ1 and the angle θ2 may each comprise a 45 degree angle. However, any angle suitable to facilitate assembly and inhibit disengagement may be selected. By way of further example, angles θ1 and θ2 may comprise any angle between 30 degrees to 60 degrees.

As illustrated in FIGS. 3A-3C, in some embodiments, the front connection surface 320 may extend along a generally perpendicular direction relative to the middle connection surface 340 of the lens connection 310. In this manner, the front connection surface 320 may further inhibit detachment of the lens 300 from the frame 200 if a front-facing force is applied to the lens 300 once assembled to the frame 200. A generally 90 degree angle of the front connection surface 320 relative to the middle connection surface 340 will advantageous provide increased retention of the lens 300 to the frame 200 when compared to a front connection surface that may be formed at a non-orthogonal angle. However, the front connection surface 320 may also be formed at an angle relative to the middle connection surface 340 that corresponds to an angle of a front connection surface 232 of the frame 200. For example, the front connection surface 320 may be formed at an angle relative to the middle connection surface 340 of any angle between 90 degrees to 45 degrees.

The front connection surface 320 and the rear connection surface 330 of the lens connection 310 can be configured to engage the frame connection 210 of the frame 200 to retain the lens 300 within the frame connection 210 once the eyewear 100 is assembled. In some instances, the front connection surface 320 and/or the rear connection surface 330 can include a peg, a barb, a screw, or other protruding structure configured to further engage the frame connection 210 by a snap fit, interference fit, or otherwise.

Each of the front connection surface 320 and the rear connection surface 330 can be configured to inhibit disengagement of the lens 300 from the frame 200. For example, as discussed herein, the front connection surface 320 can be sized and shaped to inhibit the lens 300 from disengaging the frame 200 when a front-facing force is applied to the lens 300. In some embodiments, as discussed herein, the rear connection surface 330 can be sized and shaped to inhibit the lens 300 from disengaging the frame 200 when a rear-facing force is applied to the lens 300 such that the rear connection surface 330 abutting against the rear wall 230 of the frame 200 may counteract the rear-facing force and inhibit the lens 300 from disassembling from the frame connection 210. For example, a height 330H and/or width 330W of the rear connection surface 330 may be selected to inhibit disengagement of the lens 300 during use.

As illustrated in FIG. 4B, in certain instances, a difference in heights between the height 230H of the rear wall 230 of the frame 200 and the height 330H of the rear connection surface 330 may result in an offset in height between the two surfaces. The offset may be selected as a result of the height 330H and angle θ2 of the rear connection surface 330 being configured to resist disengagement of the lens 300 along the rear wall 230, while also facilitating insertion of the lens 300 along the front wall 220. For example, the height 330H of the rear connection surface 330 may be at least about 1.5 times as large as or at least about twice as large as the height 230H of the rear wall 230 of the frame connection 210.

Figure 4A:
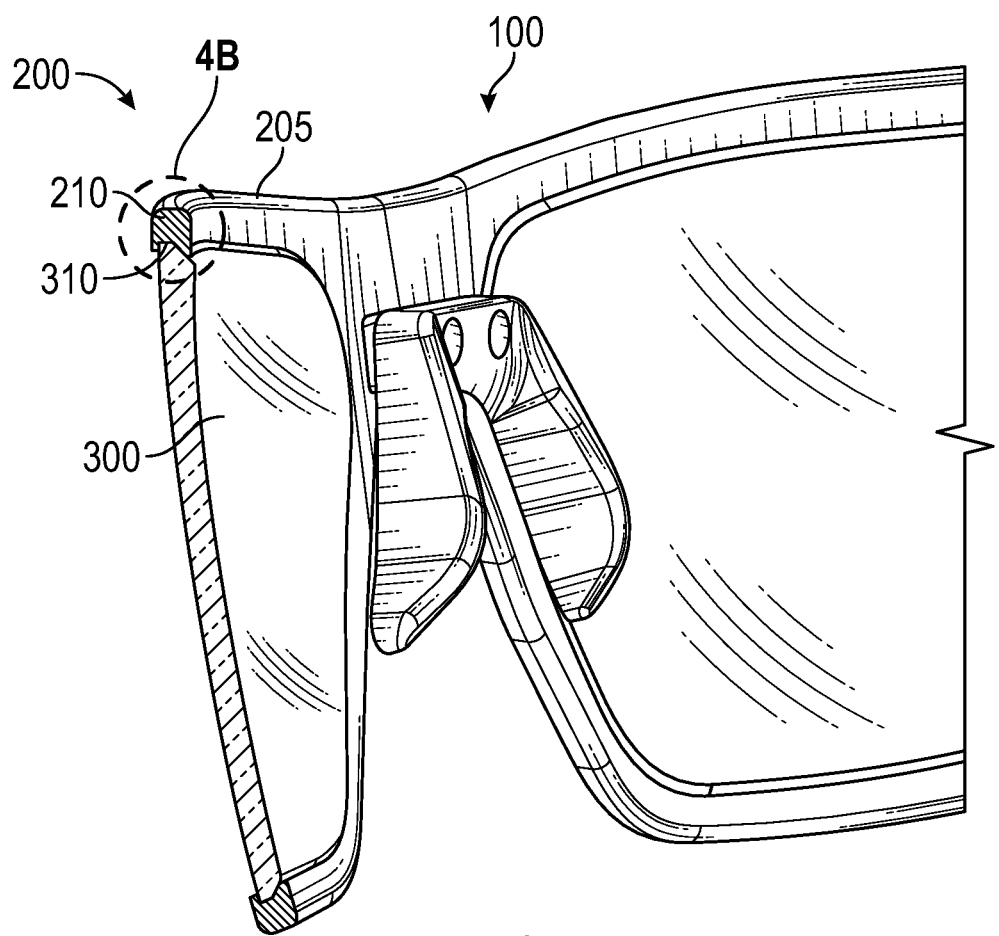
FIG. 4A is a cross-sectional side view of the eyewear of FIG. 1A taken along line 4A-4A in FIG. 1A.
Figure 4B:
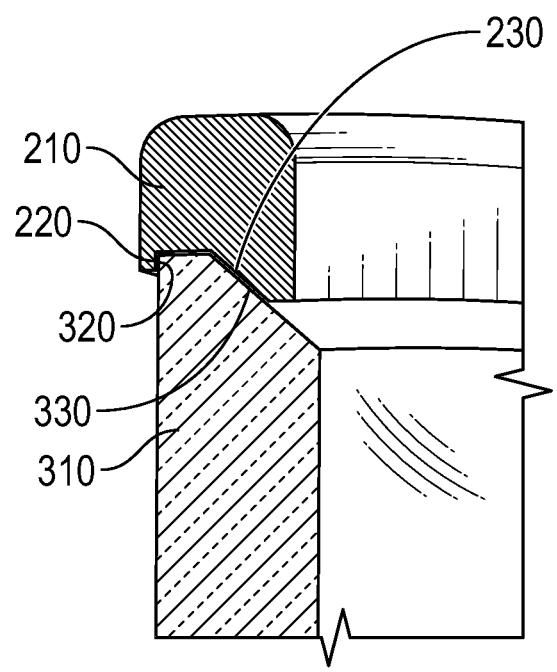
FIG. 4B is an enlarged side view of a portion of the eyewear of FIG. 4A as identified in circle 4B in FIG. 4A.

FIGS. 4A and 4B show various views of the eyewear 100. FIG. 4A is a cross-sectional view of the eyewear 100 taken along line 4A-4A illustrated in FIG. 1A, and FIG. 4B is an enlarged view of a portion of frame connection 210 and the lens connection 310 of the eyewear 100 as identified in circle 4B illustrated in FIG. 4A.

As illustrated in the figures and discussed herein, the frame connection 210 is configured to interact with the lens connection 310 when the eyewear 100 is assembled to provide secure coupling between the lens 300 and the frame 200. The secure coupling may increase retention of the lens 300 to the frame 200 to improve the overall quality of the eyewear. The coupling, as described herein, may be sufficient to satisfy at least some criteria and performance standards set forth in military standard MIL-PRF-32432A and ANSI Z87.1 standard. In some embodiments, as shown, the width 242W of the middle connection surface 242 is about the same as the width of the outermost peripheral edge of the lens 300. As illustrated, when the lens 300 is inserted into the lens-receiving region of the eyewear frame, the frame connection 210 is configured to provide an interface between the eyewear frame 200 and the lens 300 such that the frame connection 210 contacts, conforms to, corresponds with, and/or snuggly or tightly receives the lens periphery without significant or performance-affecting openings or gaps. As shown, in some embodiments, the lens 300 does not move freely within the space created by the frame connection 210 after the lens 300 is inserted, and/or the lens 300 is not under tension or stress created by, and is not bent or contorted by, the frame connection 210. The cross-section of the periphery of the lens 300 generally matches or corresponds to the cross-section of the frame connection 210.

When the eyewear 100 is assembled, as illustrated in FIGS. 4A and 4B, the front connection surface 320 of the lens connection 310 may interact with the front wall 220 and front connection surface 222 of the frame connection 210. In some embodiments, as discussed herein, at least one of the front connection surface 320 of the lens 300 and the front connection surface 222 may be oriented at a generally orthogonal or 90 degree angle relative to the middle connection surface 340 and/or the middle connection surface 242. The generally orthogonal angle orientation may provide increased retention capability and inhibit the lens 300 from disengaging from the frame 200 in certain instances. For example, if a front-facing force is applied to the lens 300 relative to the frame 200, the lens 300 may be susceptible to "popping out" and disengaging a front face of the frame 200. A front-facing force may be applied to the lens 300 in various circumstances. For example, a front-facing force may result when a projectile or other object strikes a rear face of the lens 300, thereby applying a force to the lens 300 in a direction towards a front of the eyewear 100. By way of another example, a front-facing force may result or when a projection or other object strikes a front face of the lens 300 that causes the lens 300 to abut against the rear wall 230 of the frame 200 and ultimately results in a rebounding force being applied to the lens 300 by the rear wall 230, thereby applying a force to the lens 300 back in a direction towards a front of the eyewear 100. The interaction between the front connection surface 320 and the front connection surface 320 may, in some instances, advantageously be sufficient to counteract a front-facing force being applied to the lens 300 and maintain the engagement between the lens 300 and the frame 200.

The rear connection surface 330 of the lens connection 310 may interact with the rear wall 230 and rear connection surface 232 of the frame connection 210. In some embodiments, at least one of the rear connection surface 320 of the lens 300 may be oriented at angle θ2 relative to the middle connection surface 340, and the front connection surface 222 may be oriented at angle θ1 relative to the middle connection surface 242. The generally non-orthogonal angle θ1 and angle θ2 orientation may provide increased retention capability and inhibit the lens 300 from disengaging from the frame 200 in certain instances, while also facilitating assembly of the lens 300 to the frame 200 as illustrated and described in connection with FIG. 5. For example, if a rear-facing force is applied to the lens 300 relative to the frame 200, the lens 300 may be susceptible to "popping out" and disengaging a rear face of the frame 200. A rear-facing force may be applied to the lens 300 in various circumstances. For example, a rear-facing force may result when a projectile or other object strikes a front face of the lens 300, thereby applying a force to the lens 300 in a direction towards a rear of the eyewear 100. By way of another example, a front-facing force may result or when a projection or other object strikes a rear face of the lens 300 that causes the lens 300 to abut against the front wall 220 of the frame 200 and ultimately results in a rebounding force being applied to the lens 300 by the front wall 220, thereby applying a force to the lens 300 back in a direction towards a front of the eyewear 100. The interaction between the rear connection surface 330 and the rear connection surface 330 may, in some instances, advantageously be sufficient to counteract a rear-facing force being applied to the lens 300 and maintain the engagement between the lens 300 and the frame 200.

In some embodiments, the width 340W of the middle connection surface 340 of the lens 300 may be the same or generally similar to the width 242W of the middle connection surface 242 of the frame 200. In alternative embodiments, the width 340W of the middle connection surface 340 of the lens 300 may be larger than the width 242W of the middle connection surface 242 of the frame 200. This configuration may advantageously create an increased friction fit between the lens connection 310 and the frame connection 210 when the eyewear 100 is assembled. As such, at least some deformation of the lens 300 or compression of a portion of the lens connection 310 can occur upon coupling the lens 300 with the frame 200. The compression or deformation creates sufficient friction to inhibit the lens 300 from inadvertently being separated from the frame 200 and can increase the retention capabilities of the coupling between the lens 300 and the frame 200.

Figure 5:
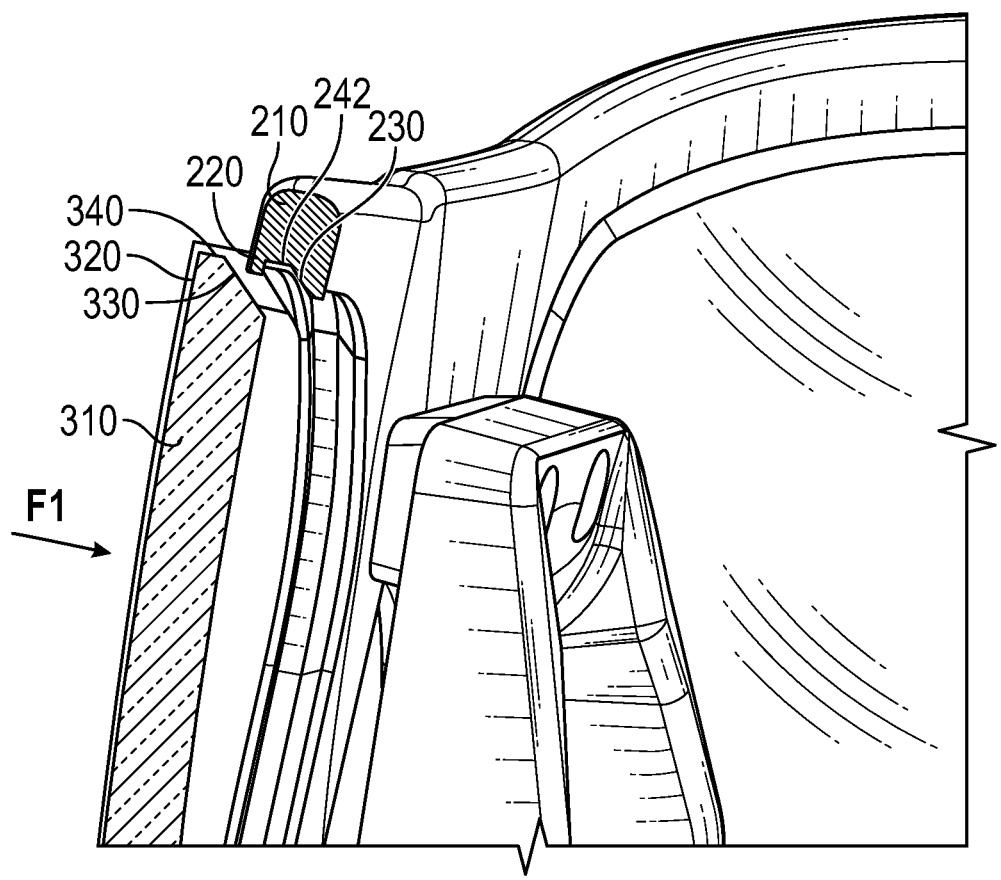
FIG. 5 is a side cross-sectional side view of an example method of assembly of an eyewear.

FIG. 5 is a cross-sectional view of the eyewear 100 and illustrates a method of assembling the lens 300 to the frame 200 of the eyewear 100. In some instances, the lens 300 may be assembled to the frame 200 through a front face of the frame 200 by applying a rear-facing force (e.g., force F1 as illustrated in FIG. 5) until the lens connection 310 interacts with the frame connection 210, as discussed in connection with FIGS. 4A and 4B. The force F1 can be directed axially, e.g., generally rearward towards the rear wall 230 of the frame 200. As the force F1 is being applied, the rear connection surface 330 of the lens 300 abuts against a front face of the front wall 220 of the frame 200. The force F1 can be sufficient to compress at least a portion of the lens 300 (e.g., the lens connection portion 310) to allow it to move beyond the front wall 220 of the frame 200 and rearward into the frame connection 210, e.g., to the position of FIGS. 4A and 4B. The angle θ1 of the rear connection surface 330 may be configured to facilitate transition of the lens connection 310 from a disengaged position in front of the front wall 220 to an engaged position. For example, the angle θ1 may be selected to provide a tapered surface so as to reduce the force required for the lens connection 310 to overcome the front wall 220. The reduction is the required force may advantageously apply less strain to the lens 300 during assembly, thereby resulting in less distortion to the lens 300 that decreases the optical qualities of the lens 300.

Example Embodiments

An antiballistic eyewear comprising:
a metal frame comprising a lens-receiving region, the lens-receiving region comprising:
  a front wall comprising a front surface and a rear connection surface, the front surface being generally parallel to the rear connection surface,
  a rear wall comprising a front connection surface and a rear surface, and
  a middle wall extending between the front wall and the rear wall,
  wherein the front connection surface is formed at a non-orthogonal angle relative to the middle wall; and
a lens comprising a peripheral edge, the peripheral edge corresponding in shape to the rear connection surface of the front wall, to the middle wall, and to the front connection surface of the rear wall,
wherein the eyewear is capable of withstanding a .15 caliber projectile traveling at a speed of 700 feet per second.

The antiballistic eyewear of any embodiment disclosed herein, wherein the rear wall extends farther into an interior of the lens-receiving region than the front wall.

The antiballistic eyewear of any embodiment disclosed herein, wherein the rear connection surface is formed at a generally orthogonal angle relative to the middle wall.

The antiballistic eyewear of any embodiment disclosed herein, wherein the middle wall comprises a width that is larger than a width of the front wall.

The antiballistic eyewear of any embodiment disclosed herein, wherein the peripheral edge of the lens is configured to form a friction fit with the lens-receiving region of the frame.

The antiballistic eyewear of any embodiment disclosed herein, wherein the peripheral edge of the lens comprises:
a front wall comprising a front connection surface being configured to interact with the rear connection surface of the front wall of the frame,
a middle wall being configured to interact with the middle wall of the frame, and a rear wall comprising a rear connection surface being configured to interact with the front connection surface of the rear wall of the frame.

The antiballistic eyewear of any embodiment disclosed herein, wherein the rear connection surface of the lens comprises a length larger than a length of the front connection surface of the rear wall of the frame.

The antiballistic eyewear of any embodiment disclosed herein, wherein the middle wall of the lens is comprises a width larger than a width of the middle wall of the frame.

The antiballistic eyewear of any embodiment disclosed herein, wherein the eyewear is configured to satisfy at least some portions of the MIL-PRF-32432A standard.

The antiballistic eyewear of any embodiment disclosed herein, wherein the rear wall extends farther into an interior of the lens-receiving region than the front wall, wherein the rear connection surface is formed at a generally orthogonal angle relative to the middle wall, wherein the peripheral edge of the lens comprises:
a front wall comprising a front connection surface being configured to interact with the rear connection surface of the front wall of the frame,
a middle wall being configured to interact with the middle wall of the frame, and
a rear wall comprising a rear connection surface being configured to interact with the front connection surface of the rear wall of the frame, and
wherein the eyewear is configured to satisfy at least some portions of the MIL-PRF-32432A standard.

An eyewear comprising:
one or more lens, each of the one or more lens comprising:
a first front connection surface, and
a first rear connection surface being formed at a first angle relative to the first front connection surface;
a frame comprising a frame connection structure, the frame connection structure being configured to receive at least a portion of the one or more lens to couple the one or more lens to the frame, the frame connection structure comprising:
a second front connection surface being configured to interact with the first front connection surface of the one or more lens, the second front connection surface comprising a first height; and
a second rear connection surface comprising a second height, the second height being greater than the first height of the second front connection surface such that the second rear connection surface is offset relative to the second front connection surface, the second rear connection surface being formed at a second angle relative to the second front connection surface and being generally similar to the first angle of the first rear connection surface, the second rear connection surface being configured to interact with the first rear connection surface of the one or more lens.

The eyewear of any embodiment disclosed herein, wherein each of the one or more lens further comprises a first middle connection surface, and wherein the frame connection structure further comprises a second middle connection surface.

The eyewear of any embodiment disclosed herein, wherein the first middle connection comprises a first width that is larger than a second width of the second middle connection surface.

The eyewear of any embodiment disclosed herein, wherein the first front connection surface extends from the first middle connection surface, and wherein the first rear connection surface extends from the first middle connection surface.

The eyewear of any embodiment disclosed herein, wherein the second front connection surface extends from the second middle connection surface, and wherein the second rear connection surface extends from the second middle connection surface.

The eyewear of any embodiment disclosed herein, wherein the first rear connection surface comprises a first length that is larger than a second length of the second rear connection surface.

The eyewear of any embodiment disclosed herein, wherein the frame is metal.

The eyewear of any embodiment disclosed herein, wherein the frame connection structure is configured to form a friction fit with the portion of the one or more lens.

The eyewear of any embodiment disclosed herein, wherein the eyewear is configured to satisfy at least some portions of the MIL-PRF-32432A standard.

The eyewear of any embodiment disclosed herein, wherein the first rear connection surface comprises a first length that is larger than a second length of the second rear connection surface,
wherein a first middle connection surface of the one or more lens extends from the first front connection surface, and wherein the first middle connection surface extends from the first rear connection surface,
wherein a second middle connection surface of the frame connection portion extends from the second front connection surface, and wherein the second middle connection surface extends from the second rear connection surface, and
wherein the frame is metal,
wherein the eyewear is configured to satisfy at least some portions of the MIL-PRF-32432A standard.

Variations

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1" includes "1." Phrases preceded by a term such as "substantially," "generally," and the like include the recited phrase and should be interpreted based on the circumstances (e.g., as much as reasonably possible under the circumstances). For example, "substantially spherical" includes "spherical." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Although certain embodiments and examples have been described herein, it should be emphasized that many variations and modifications may be made to the elbow joint prosthesis shown and described in the present disclosure, the elements of which are to be understood as being differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of the inventions extends beyond the specifically disclosed embodiments to any and all embodiments having equivalent elements, modifications, omissions, combinations or sub-combinations of the specific features and aspects of the embodiments (e.g., of aspects across various embodiments), adaptations and/or alterations, and uses of the inventions as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication.

The following is claimed:

1. An antiballistic eyewear comprising:
    a metal frame comprising a lens-receiving region, the lens-receiving region comprising:
        a front wall comprising a front surface and a rear connection surface, the front surface being generally parallel to the rear connection surface,
        a rear wall comprising a front connection surface and a rear surface, the rear wall extending farther into an interior of the lens-receiving region than the front wall, and
        a middle wall extending between the front wall and the rear wall,
        wherein the front connection surface is formed at a non-orthogonal angle relative to the middle wall; and
    a lens comprising a peripheral edge, the peripheral edge corresponding in shape to the rear connection surface of the front wall, to the middle wall, and to the front connection surface of the rear wall,
    wherein the eyewear is capable of withstanding a projectile of at least about .15 caliber traveling at a speed of at least about 700 feet per second without shattering, penetrating through the lens, or removing the lens from the frame.

2. The antiballistic eyewear of claim 1, wherein the rear connection surface is formed at a generally orthogonal angle relative to the middle wall.

3. The antiballistic eyewear of claim 1, wherein the middle wall comprises a width that is larger than a width of the front wall.

4. The antiballistic eyewear of claim 1, wherein the peripheral edge of the lens is configured to form a friction fit with the lens-receiving region of the frame.

5. The antiballistic eyewear of claim 1, wherein the peripheral edge of the lens comprises:
    a front wall comprising a front connection surface being configured to interact with the rear connection surface of the front wall of the frame,
    a middle wall being configured to interact with the middle wall of the frame, and
    a rear wall comprising a rear connection surface being configured to interact with the front connection surface of the rear wall of the frame.

6. The antiballistic eyewear of claim 5, wherein the rear connection surface of the lens comprises a length larger than a length of the front connection surface of the rear wall of the frame.

7. The antiballistic eyewear of claim 5, wherein the middle wall of the lens comprises a width larger than a width of the middle wall of the frame.

8. The antiballistic eyewear of claim 1, wherein the eyewear is configured to satisfy at least some portions of the MIL-PRF-32432A standard.

9. The antiballistic eyewear of claim 1,
    wherein the rear connection surface is formed at a generally orthogonal angle relative to the middle wall,
    wherein the peripheral edge of the lens comprises:
        a front wall comprising a front connection surface being configured to interact with the rear connection surface of the front wall of the frame, a middle wall being configured to interact with the middle wall of the frame, and a rear wall comprising a rear connection surface being configured to interact with the front connection surface of the rear wall of the frame, and wherein the eyewear is configured to satisfy at least some portions of the MIL-PRF-32432A standard.

10. An eyewear comprising:

one or more lens, each of the one or more lens comprising:
   a first front connection surface,
   a first rear connection surface being formed at a first angle relative to the first front connection surface, and
   a first middle connection surface comprising a first width; and a frame comprising a frame connection structure, the frame connection structure being configured to receive at least a portion of the one or more lens to couple the one or more lens to the frame, the frame connection structure comprising:
   a second front connection surface being configured to interact with the first front connection surface of the one or more lens, the second front connection surface comprising a first height,
   a second rear connection surface comprising a second height, the second height being greater than the first height of the second front connection surface such that the second rear connection surface is offset relative to the second front connection surface, the second rear connection surface being formed at a second angle relative to the second front connection surface and being generally similar to the first angle of the first rear connection surface, the second rear connection surface being configured to interact with the first rear connection surface of the one or more lens, and
   a second middle connection surface comprising a second width, the first width being larger than the second width.

11. The eyewear of claim 10, wherein the first front connection surface extends from the first middle connection surface, and wherein the first rear connection surface extends from the first middle connection surface.

12. The eyewear of claim 10, wherein the second front connection surface extends from the second middle connection surface, and wherein the second rear connection surface extends from the second middle connection surface.

13. The eyewear of claim 10, wherein the first rear connection surface comprises a first length that is larger than a second length of the second rear connection surface.

14. The eyewear of claim 10, wherein the frame is metal.

15. The eyewear of claim 10, wherein the frame connection structure is configured to form a friction fit with the portion of the one or more lens.

16. The eyewear of claim 10, wherein the eyewear is configured to satisfy at least some portions of the MIL-PRF-32432A standard.

17. The eyewear of claim 10, wherein the first rear connection surface comprises a first length that is larger than a second length of the second rear connection surface,
   wherein a first middle connection surface of the one or more lens extends from the first front connection surface, and wherein the first middle connection surface extends from the first rear connection surface,
   wherein a second middle connection surface of the frame connection portion extends from the second front connection surface, and wherein the second middle connection surface extends from the second rear connection surface, and wherein the frame is metal, wherein the eyewear is configured to satisfy at least some portions of the MIL-PRF-32432A standard.

18. An antiballistic eyewear comprising:

a metal frame comprising a lens-receiving region, the lens-receiving region comprising:
   a front wall comprising a front surface and a rear connection surface, the front surface being generally parallel to the rear connection surface,
   a rear wall comprising a front connection surface and a rear surface, and
   a middle wall extending between the front wall and the rear wall,
   wherein the front connection surface is formed at a non-orthogonal angle relative to the middle wall, and
   wherein the rear connection surface is formed at a generally orthogonal angle relative to the middle wall; and a lens comprising a peripheral edge, the peripheral edge corresponding in shape to the rear connection surface of the front wall, to the middle wall, and to the front connection surface of the rear wall, wherein the eyewear is capable of withstanding a projectile of at least about .15 caliber traveling at a speed of at least about 700 feet per second without shattering, penetrating through the lens, or removing the lens from the frame.

19. The antiballistic eyewear of claim 18, wherein the middle wall comprises a width that is larger than a width of the front wall.

20. The antiballistic eyewear of claim 18, wherein the peripheral edge of the lens is configured to form a friction fit with the lens-receiving region of the frame.

21. The antiballistic eyewear of claim 18, wherein the peripheral edge of the lens comprises:
   a front wall comprising a front connection surface being configured to interact with the rear connection surface of the front wall of the frame,
   a middle wall being configured to interact with the middle wall of the frame, and
   a rear wall comprising a rear connection surface being configured to interact with the front connection surface of the rear wall of the frame.

22. The antiballistic eyewear of claim 21, wherein the rear connection surface of the lens comprises a length larger than a length of the front connection surface of the rear wall of the frame.

23. The antiballistic eyewear of claim 21, wherein the middle wall of the lens is comprises a width larger than a width of the middle wall of the frame.

24. The antiballistic eyewear of claim 18, wherein the eyewear is configured to satisfy at least some portions of the MIL-PRF-32432A standard.

25. The antiballistic eyewear of claim 18, wherein the rear wall extends farther into an interior of the lens-receiving region than the front wall,
   wherein the rear connection surface is formed at a generally orthogonal angle relative to the middle wall,
   wherein the peripheral edge of the lens comprises:
      a front wall comprising a front connection surface being configured to interact with the rear connection surface of the front wall of the frame,
      a middle wall being configured to interact with the middle wall of the frame, and a rear wall comprising a rear connection surface being configured to interact with the front connection surface of the rear wall of the frame, and wherein the eyewear is configured to satisfy at least some portions of the MIL-PRF-32432A standard.

26. An antiballistic eyewear comprising:
a metal frame comprising a lens-receiving region, the lens-receiving region comprising:
a front wall comprising a front surface and a rear connection surface, the front surface being generally parallel to the rear connection surface,
a rear wall comprising a front connection surface and a rear surface, and
a middle wall extending between the front wall and the rear wall,
wherein the front connection surface is formed at a non-orthogonal angle relative to the middle wall; and
a lens comprising a peripheral edge, the peripheral edge corresponding in shape to the rear connection surface of the front wall, to the middle wall, and to the front connection surface of the rear wall, the peripheral edge comprising:
a front wall comprising a front connection surface being configured to interact with the rear connection surface of the front wall of the frame,
a middle wall being configured to interact with the middle wall of the frame, the middle wall comprising a width larger than a width of the middle wall of the frame, and
a rear wall comprising a rear connection surface being configured to interact with the front connection surface of the rear wall of the frame,
wherein the eyewear is capable of withstanding a projectile of at least about .15 caliber traveling at a speed of at least about 700 feet per second without shattering, penetrating through the lens, or removing the lens from the frame.

27. The antiballistic eyewear of claim 26, wherein the middle wall comprises a width that is larger than a width of the front wall.

28. The antiballistic eyewear of claim 26, wherein the peripheral edge of the lens is configured to form a friction fit with the lens-receiving region of the frame.

29. The antiballistic eyewear of claim 26, wherein the rear connection surface of the lens comprises a length larger than a length of the front connection surface of the rear wall of the frame.

30. The antiballistic eyewear of claim 26, wherein the eyewear is configured to satisfy at least some portions of the MIL-PRF-32432A standard.

31. The antiballistic eyewear of claim 26, wherein the rear wall extends farther into an interior of the lens-receiving region than the front wall,
wherein the rear connection surface is formed at a generally orthogonal angle relative to the middle wall,
wherein the peripheral edge of the lens comprises:
a front wall comprising a front connection surface being configured to interact with the rear connection surface of the front wall of the frame,
a middle wall being configured to interact with the middle wall of the frame, and
a rear wall comprising a rear connection surface being configured to interact with the front connection surface of the rear wall of the frame, and
wherein the eyewear is configured to satisfy at least some portions of the MIL-PRF-32432A standard.

32. An eyewear comprising:
one or more lens, each of the one or more lens comprising:
a first front connection surface, and
a first rear connection surface being formed at a first angle relative to the first front connection surface, the first rear connection surface comprising a first length; and
a frame comprising a frame connection structure, the frame connection structure being configured to receive at least a portion of the one or more lens to couple the one or more lens to the frame, the frame connection structure comprising:
a second front connection surface being configured to interact with the first front connection surface of the one or more lens, the second front connection surface comprising a first height; and
a second rear connection surface comprising a second height and a second length, the second height being greater than the first height of the second front connection surface such that the second rear connection surface is offset relative to the second front connection surface, the first length being larger than the second length, the second rear connection surface being formed at a second angle relative to the second front connection surface and being generally similar to the first angle of the first rear connection surface, the second rear connection surface being configured to interact with the first rear connection surface of the one or more lens.

33. The eyewear of claim 32, wherein each of the one or more lens further comprises a first middle connection surface, and wherein the frame connection structure further comprises a second middle connection surface.

34. The eyewear of claim 33, wherein the first front connection surface extends from the first middle connection surface, and wherein the first rear connection surface extends from the first middle connection surface.

35. The eyewear of claim 33, wherein the second front connection surface extends from the second middle connection surface, and wherein the second rear connection surface extends from the second middle connection surface.

36. The eyewear of claim 32, wherein the frame is metal.

37. The eyewear of claim 32, wherein the frame connection structure is configured to form a friction fit with the portion of the one or more lens.

38. The eyewear of claim 32, wherein the eyewear is configured to satisfy at least some portions of the MIL-PRF-32432A standard.

39. The eyewear of claim 32, wherein the first rear connection surface comprises a first length that is larger than a second length of the second rear connection surface,
wherein a first middle connection surface of the one or more lens extends from the first front connection surface, and wherein the first middle connection surface extends from the first rear connection surface,
wherein a second middle connection surface of the frame connection portion extends from the second front connection surface, and wherein the second middle connection surface extends from the second rear connection surface, and
wherein the frame is metal,
wherein the eyewear is configured to satisfy at least some portions of the MIL-PRF-32432A standard.

* * * * *